US006177683B1

(12) United States Patent
Kolesar et al.

(10) Patent No.: US 6,177,683 B1
(45) Date of Patent: Jan. 23, 2001

(54) PORTABLE VIEWER FOR INVISIBLE BAR CODES

(75) Inventors: Jason R. Kolesar, Holly Springs; Gerard A. DeRome, Cary; James M. Guberski, Holly Springs; Edward J. Kapturowski, Apex, all of NC (US)

(73) Assignee: C2it, Inc., Holly Springs, NC (US)

( * ) Notice: Under 35 U.S.C. 154(b), the term of this patent shall be extended for 0 days.

(21) Appl. No.: 09/200,312

(22) Filed: Nov. 25, 1998

(51) Int. Cl.⁷ .................................................... G06K 19/00

(52) U.S. Cl. .......................... 250/566; 280/568; 235/491; 235/468

(58) Field of Search .................................... 250/566, 568, 250/239; 235/462.01, 462.46, 468, 470, 491

(56) References Cited

U.S. PATENT DOCUMENTS

| | | | | |
|---|---|---|---|---|
| 4,540,595 | | 9/1985 | Acitelli et al. . | |
| 4,603,262 | | 7/1986 | Eastman et al. . | |
| 5,093,147 | | 3/1992 | Andrus et al. . | |
| 5,270,526 | * | 12/1993 | Yoshihara | 235/487 |
| 5,423,432 | | 6/1995 | Krutak et al. . | |
| 5,542,971 | | 8/1996 | Auslander et al. . | |
| 5,547,501 | | 8/1996 | Maruyama et al. . | |
| 5,629,512 | * | 5/1997 | Haga | 235/468 |
| 5,693,693 | | 12/1997 | Auslander et al. . | |
| 5,861,618 | * | 1/1999 | Berson | 235/491 |

* cited by examiner

*Primary Examiner*—Stephone B. Allen
(74) *Attorney, Agent, or Firm*—Coats & Bennett, PLLC

(57) ABSTRACT

A portable viewer for viewing bar codes and other markings printed at least in part with invisible inks includes a light source for illuminating and exciting the ink of the bar code, a camera for detecting light emitted by the excited bar code and for outputting image data, a display for creating a visible image of the bar code from the image data output from the camera, and an optical system for projecting the visible image onto a viewing screen. The display may be a miniature, transmissive active matrix liquid crystal display with high resolution that produces a sharp, bright image. A backlight and lens project the image produced by the display to generate an enlarged virtual image that can be easily viewed by a user. The portable viewer is compact in size and can be accommodated in a small package and requires only a small amount of power.

24 Claims, 6 Drawing Sheets

PORTABLE VIEWER FOR INVISIBLE BAR CODES

FIELD OF THE INVENTION

The present invention relates generally to the field of bar code readers and viewers, and more particularly to a portable bar code viewer for viewing bar codes and other markings that are not visible to the unaided eye.

BACKGROUND OF THE INVENTION

Bar codes have been used in a wide variety of applications as a method for conveying information about products. For example, bar codes are frequently applied to products to identify the product and the price of the product. This information is used by point-of-sale terminals, quality control systems, and inventory control systems. Bar codes are also frequently used in personnel access systems and mailing systems.

Bar codes typically comprise a series of black lines. The width and spacing between the lines corresponds to a code. There are many different kinds of bar codes known in the art. In each bar code system, an alphanumeric character or other symbol is represented by a unique pattern of lines. The bar code is read by scanning the bar code with a beam of visible, infrared, or ultraviolet light. The lines of the bar code absorb a portion of the light and a portion of the light is reflected by the background of the bar code, or vice versa. The light reflected from the bar code is detected by the scanner, converted into an electrical signal and then decoded.

Most bar codes are printed with inks that are visible to the naked eye. One disadvantage of visible bar codes is that the visible bar code takes up space on products and labels, often detracting from their appearance. Inks that are not visible to the naked eye have also been used in the past to print bar codes. Bar codes printed in invisible inks can be printed over other information on labels, thereby saving space on the product, package, or label. Also, invisible bar codes can be used to authenticate products or documents and to prevent or hinder counterfeiting. For example, invisible bar codes can be printed on stock certificates, bonds, currency, and licenses. Unlike visible bar codes, invisible bar codes are difficult to forge because special inks are required that may not be generally available.

When bar codes are printed in invisible inks, there is a problem in locating the code so that it can be scanned. Viewers or scanners for reading invisible bar codes tend to be large and bulky and therefore not suitable for use as portable, hand-held scanners or viewers. Accordingly, there is a need for a portable scanner or viewer that is capable of reading invisible bar codes or other markings.

SUMMARY OF THE INVENTION

The present invention is a portable viewer for viewing bar codes and other markings printed in whole or in part with invisible inks. The viewer comprises a light source for illuminating and exciting the ink of the bar code, a camera for detecting light emitted by the excited bar code and for outputting image data, a display for creating a visible image of the bar code from the image data output from the camera, and an optical system for projecting the visible image onto a viewing screen. The display is preferably a miniature, transmissive active matrix liquid crystal display (AMLCD) with high resolution that produces a sharp, bright image. A backlight and lens project the image produced by the display to generate an enlarged virtual image that can be easily viewed on the viewing screen.

One benefit of a viewer using such a display and optical system is that it requires only a small amount of power. Therefore, a relatively small battery can be used to power the viewer. Also, the components are compact in size and can be accommodated in a small package. These factors are important in being able to meet the demand for a portable, hand-held viewer capable of reading invisible bar codes or other markings.

DETAILED DESCRIPTION OF THE INVENTION

Figure 1:
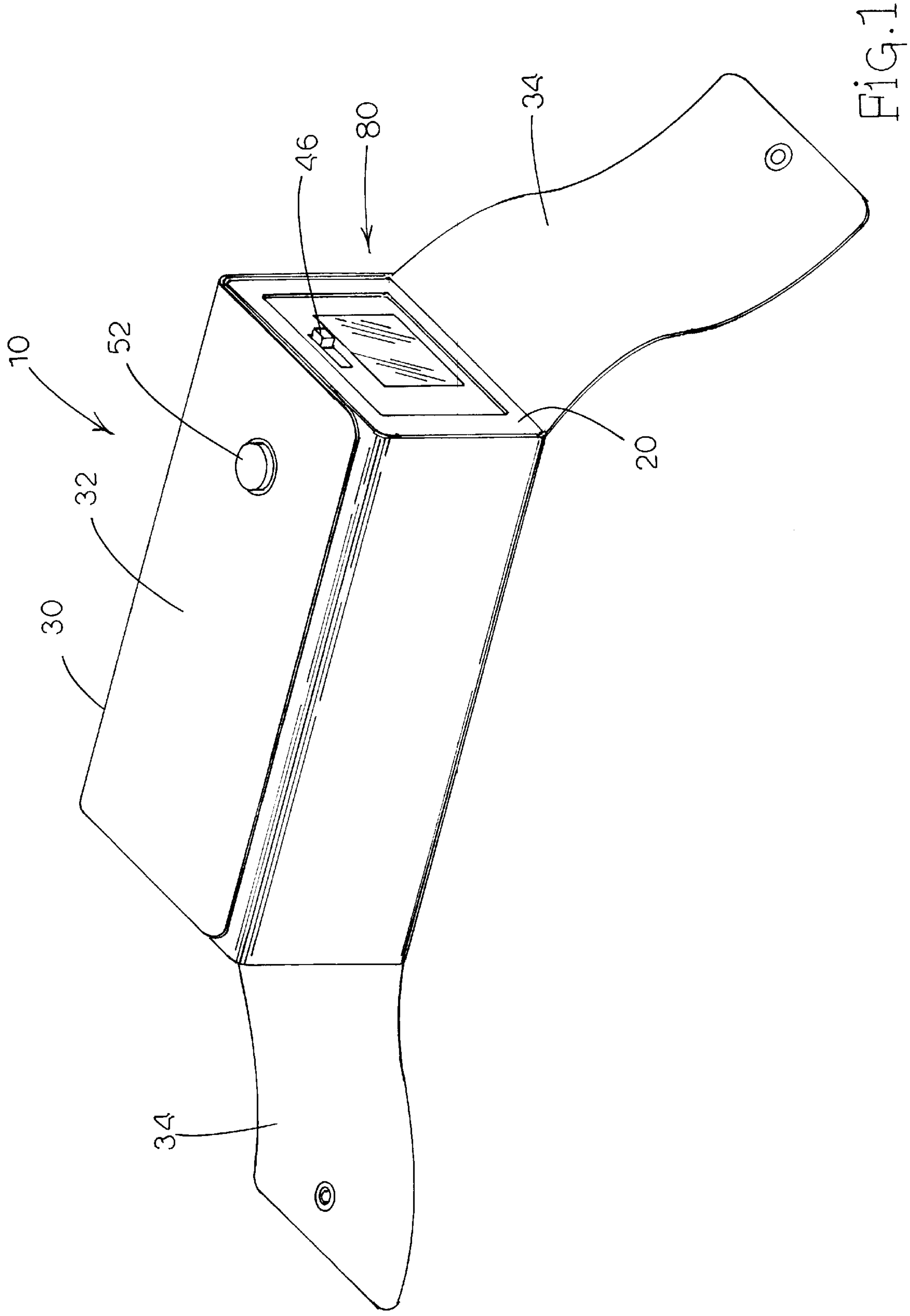
FIG. 1 is a perspective view of the bar code viewer of the present invention including the optional sheath with the end flaps open showing the viewing end.

For purposes of illustration, the present invention will be described in the context of viewing an invisible bar code. However, the present invention is not so limited and also encompasses viewing other invisible markings, for example, certification marks and the like, and viewing markings having both visible and invisible portions.

Referring now to the drawings, the bar code viewer of the present invention is shown therein and indicated generally by the numeral 10. The bar code viewer 10 includes a housing 20 containing a battery 42, a power supply 44, a light source 50, a camera 60, an electronic display 70, and an optical system 80 for viewing the image on the display 70. The battery 42, which may be a single cell or multiple cells, supplies power to the rest of the viewer 10 via the power supply 44. The power supply 44 conditions the power from the battery 42 to a type suitable for driving the rest of the electrical components of the viewer 10. The light source 50 illuminates the invisible bar code. The camera 60 detects light reflected or emitted by the invisible bar code. The electronic display 70 produces a visible image from data output from the electronic camera 60.

The power supply 44 should be highly power-efficient. One or more on/off switches 46,48 may be interposed between the battery 42 and the power supply 44 so as to enable the viewer 10 to be turned on and off. Preferably, one switch 46 is a slidable type and the other 48 is a momentary press type such that when the first switch 46 is enabled and the second switch 48 is pressed, the bar code viewer 10 is turned on; otherwise the viewer 10 is not powered.

The light source 50 comprises at least one, and preferably a plurality of light emitting diodes (LEDs) 50, and is typically disposed on one end face of the housing 20. The are preferably eight LEDs 50 arranged in a two row array on either side of the lens of the camera 60. For this described embodiment, the LEDs 50 illuminate the invisible bar code with light having a wavelength of approximately 685 nm. When the bar code is illuminated at this wavelength, the phosphors in the ink emit light above 690 nm which is detected by the camera 60. An example of LEDs 50 suitable for this embodiment are model CMD41101UR/E lamps from Chicago Miniature of Buffalo Grove, Ill. These LEDs 50 have a peak wavelength of 660 nm, but produce a significant amount of light at 685 nm when energized. The typical inks used for invisible bar codes are excited by light at 685 nm and emit light in the range of 700–1100 nm in response thereto. The LEDs 50 should also produce very little, if any, light above 700 nm, thereby minimizing interference with the detection of emitted light from the bar code. As described above, the activation of the light source 50 is controlled by switches 46,48 so that the power usage by the light source 50 can be limited to only when necessary for viewing.

The camera 60 is a commercially available CCD, CMOS, or the like type of camera. One embodiment uses a model VL5402-S-003 camera 60 manufactured by VLSI Vision Ltd. of Scotland. The VL5402 camera 60 incorporates a 388×295 pixel image sensor and a fixed aperture lens. The camera 60 produces a composite analog video signal. The video signal output from the camera 60 is directed by a display switch 74 to either an external monitor (not shown) or to a standard RS170/LCD driver circuit 66. The driver circuit 66 converts the analog video signals to digital signals that are used to drive the display 70. The driver circuit 66 also produces the proper voltage to drive the backlight 72. If desired, display switch 74 may also control power to the driver circuit 66 so as depower the driver circuit 66 when the video signal output is directed to the external monitor, thereby further reducing unnecessary power usage.

The camera 60 preferably includes an infrared filter 62 attached to the lens of the camera 60. The filter 62 reduces background light and light from the light source 50 sufficiently to allow the camera 60 to detect the bar code. For example, a model RT-380 filter from Edmund Scientific of Barrington, N.J. may be used. This filter 62 blocks most light below 700 nm (approximately 95%), but allows light to pass through that is between 700 nm and approximately 1200 nm. Thus, the filter 62 allows the light emitted by the invisible ink to pass through, but preferentially blocks any reflected light from the light source 50. Further, the filter 62 should limit or completely prevent unwanted ambient light from reaching the camera 60.

While a particular light source 50 and filter 62 combination has been used for illustrative purposes, other light sources 50 and filters 62 may be used. The particular light source 50 and filter 62 identified above are suitable for detecting the invisible ink known as CLIR Code ink available from Eastman Chemical Company of Kingsport, Tenn. In practice, the light source 50 and filter 62 used for a particular viewer 10 will depend upon the characteristics of the invisible ink to be detected. The light source 50 should be able to excite the ink, and the filter 62 should allow the ink-emitted light to pass through but preferentially block most of the visible spectrum and the light emitted by the light source 50.

Also disposed on the housing 20 near the opening for the lens of the camera 60 may be an ambient infrared light sensor 54 which senses when the ambient infrared light levels are too high. High ambient infrared light levels have a tendency to drown out the light from the invisible ink, thereby making viewing very difficult. The ambient infrared light sensor 54 should cause an alarm to be activated, such as activating a warning indicator, when the ambient light levels are above a predetermined level, such as approximately 2 lux of sunlight or incandescent light.

As mentioned above, the display 70 is preferably a transmissive type active matrix display. In the disclosed embodiment, the display 70 is a monochrome display that produces sharp, bright images. An example of a suitable display 70 has a resolution of 320×240 pixels and an active area measuring 0.24 inches diagonally. The display 70 includes a low power backlight 72 with high optical efficiency. The backlight 72 preferably provides approximately twenty foot-Lamberts of light. The display 70 and backlight 72 together have a low power consumption less than 20 mW. A display 70 and backlight 72 assembly suitable for use with the present invention is the Cyberdisplay monochrome display/backlight module (part no. KCD-QM01-AA) sold by Kopin Corporation of Taunton, Mass.

The optical system 80 enlarges and projects the image produced by the display 70, which is too small for practical viewing. The optical system 80 includes a magnifying lens 82 and a kinoform 84. The lens has a 16° field of view, allowing the bar code viewer 10 to be held at a comfortable distance from the viewer's eye. The kinoform 84 provides color correction depending on the color of the backlight 72. Both the lens 82 and the kinoform 84 have an anti-reflective coating to reduce glare. A hard coating may also be applied to prevent abrasion of the lens 82 and kinoform 84. As an alternative to hard-coating, a cover glass may be used to protect the kinoform 84 and lens 82. In order to eliminate distortion, the central axis of the lens 82 should be substantially coplanar with the axis of the display 70 to within 1° (+/−0.5°). The kinoform 84 should also be aligned with the lens 82 for best viewing. For best results, the placement of the center of the kinoform 84 with respect to the optic axis of the lens 82 should be tightly controlled. Deviation from the optic axis should be within approximately 0.005 to 0.01 mm. Tilt of approximately 1° should not substantially degrade color correction of the kinoform 84. The optical system 80 may be built from discrete components or may be purchased as an assembly. Kopin Corporation makes optical assemblies suitable for practicing the present invention under the model name Cyberlens.

A focusing mechanism (not shown) may be included to accommodate the average range of vision. If a focusing mechanism is employed, the lens 82 and kinoform 84 should preferably be moved together, maintaining a constant separation distance.

The display 70 and backlight 72 are designed to conserve space and to fit into a compact package suitable for use as a portable viewer 10. Further, the components have an extremely low power consumption rate so that smaller batteries 42 can be used. Although the display 70 itself is miniature in size, when viewed through the magnifying lens 82 of one preferred embodiment the image is equivalent to viewing a twenty inch display from a distance of five feet. Using the components identified above, the effective focal length of the optical system 80 should be approximately 0.84 inches with a back focal length of approximately 0.68 inches, and a f number of 1.18. The miniature display 70 with its low power consumption, in combination with the optical system 80, enables the building of a highly compact, portable viewer 10.

Figure 2:
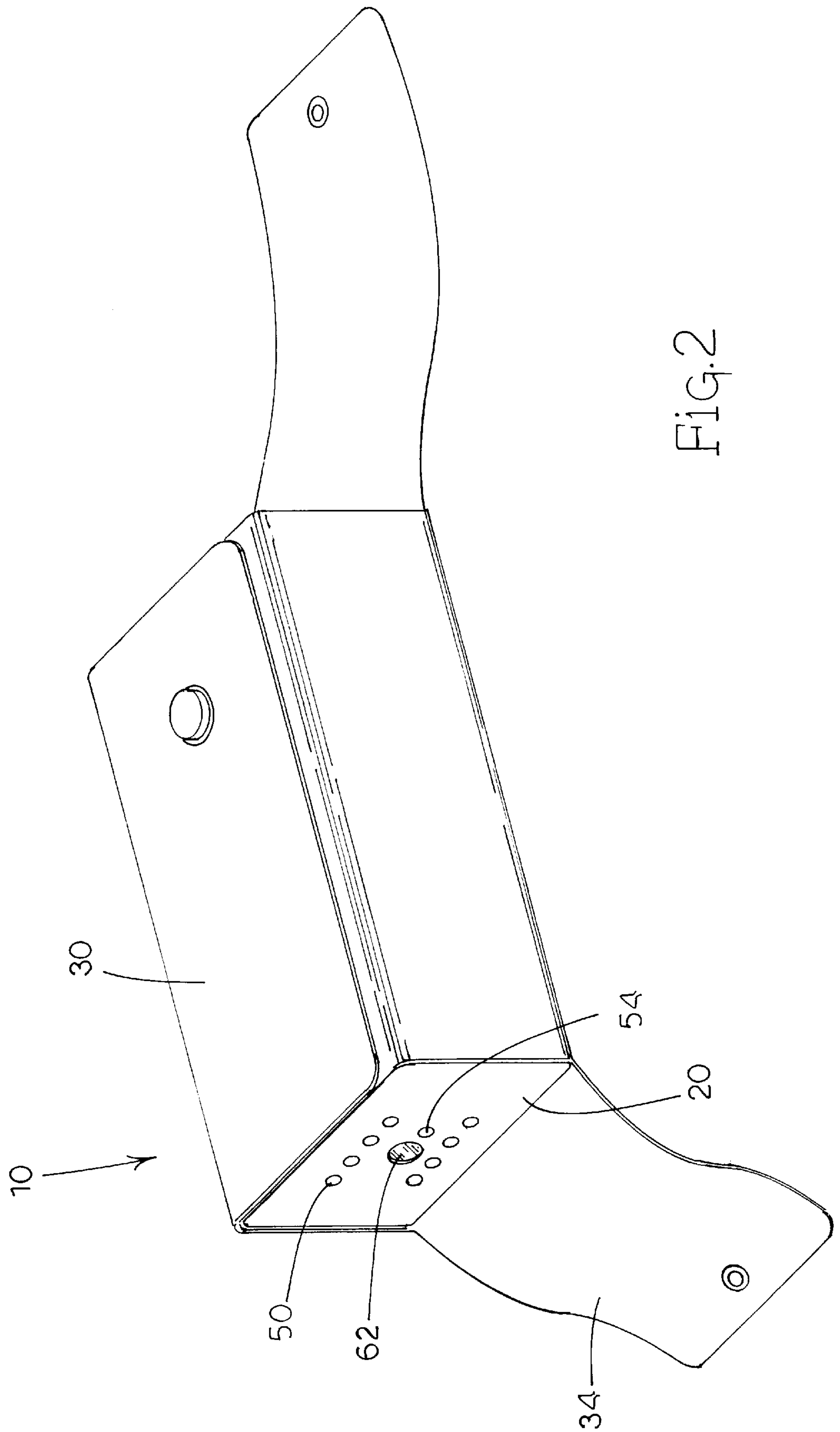
FIG. 2 is a perspective view of the bar code viewer of FIG. 1 showing the light source end.
Figure 3:
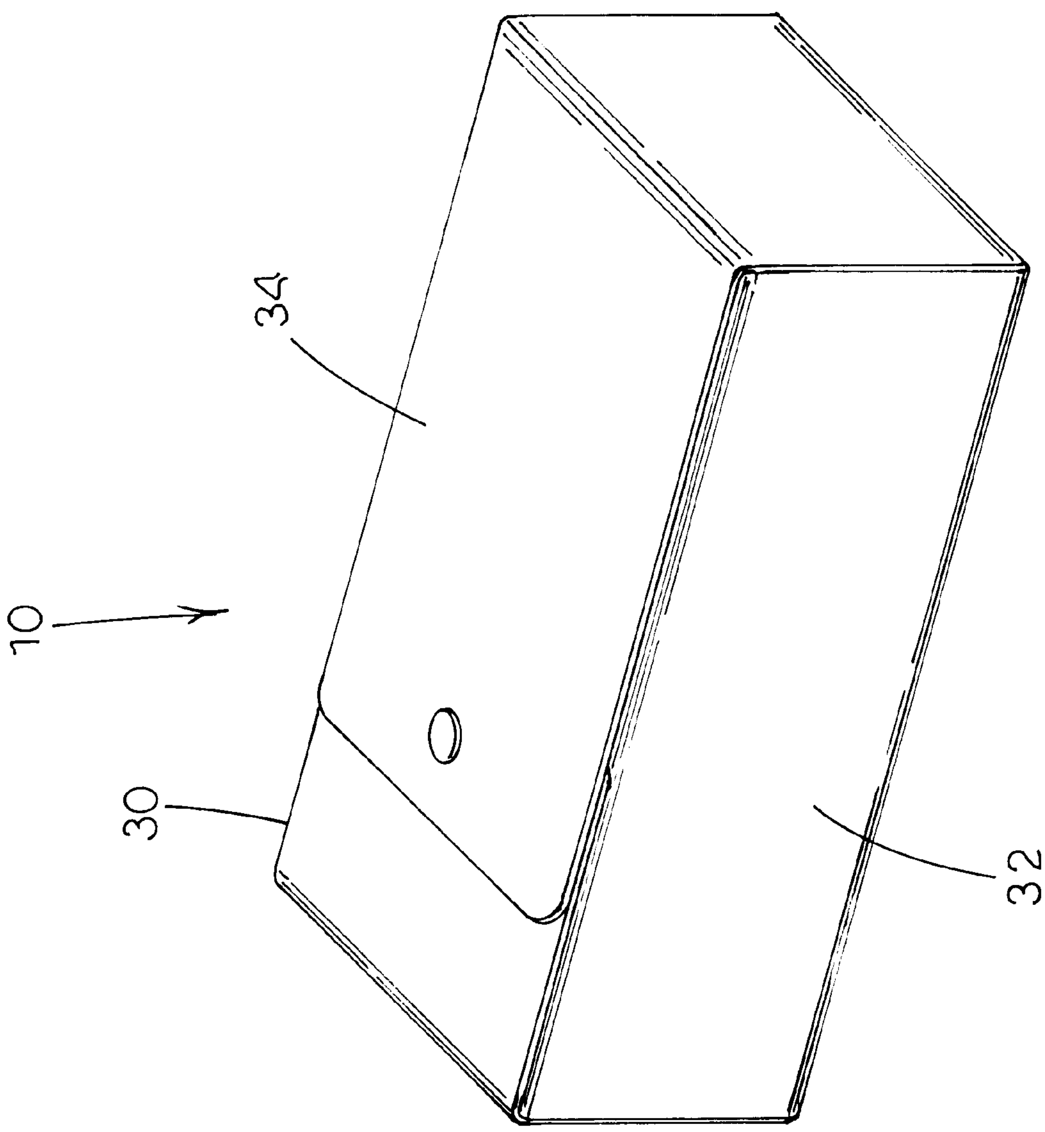
FIG. 3 is a perspective view of the bar code viewer of FIG. 1 with the sheath end flaps closed.
Figure 4:
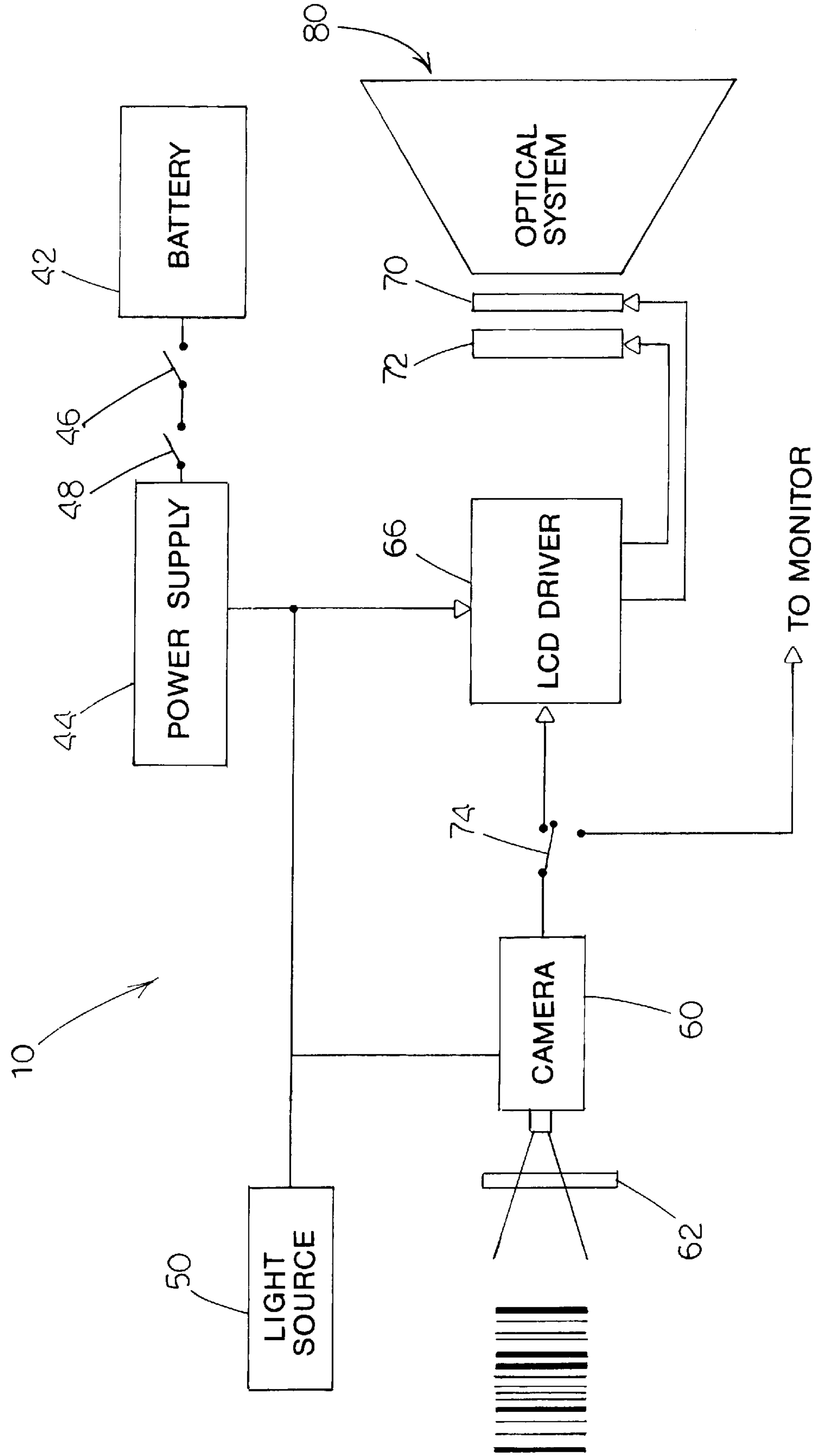
FIG. 4 is a schematic block diagram of the bar code viewer.
Figure 5:
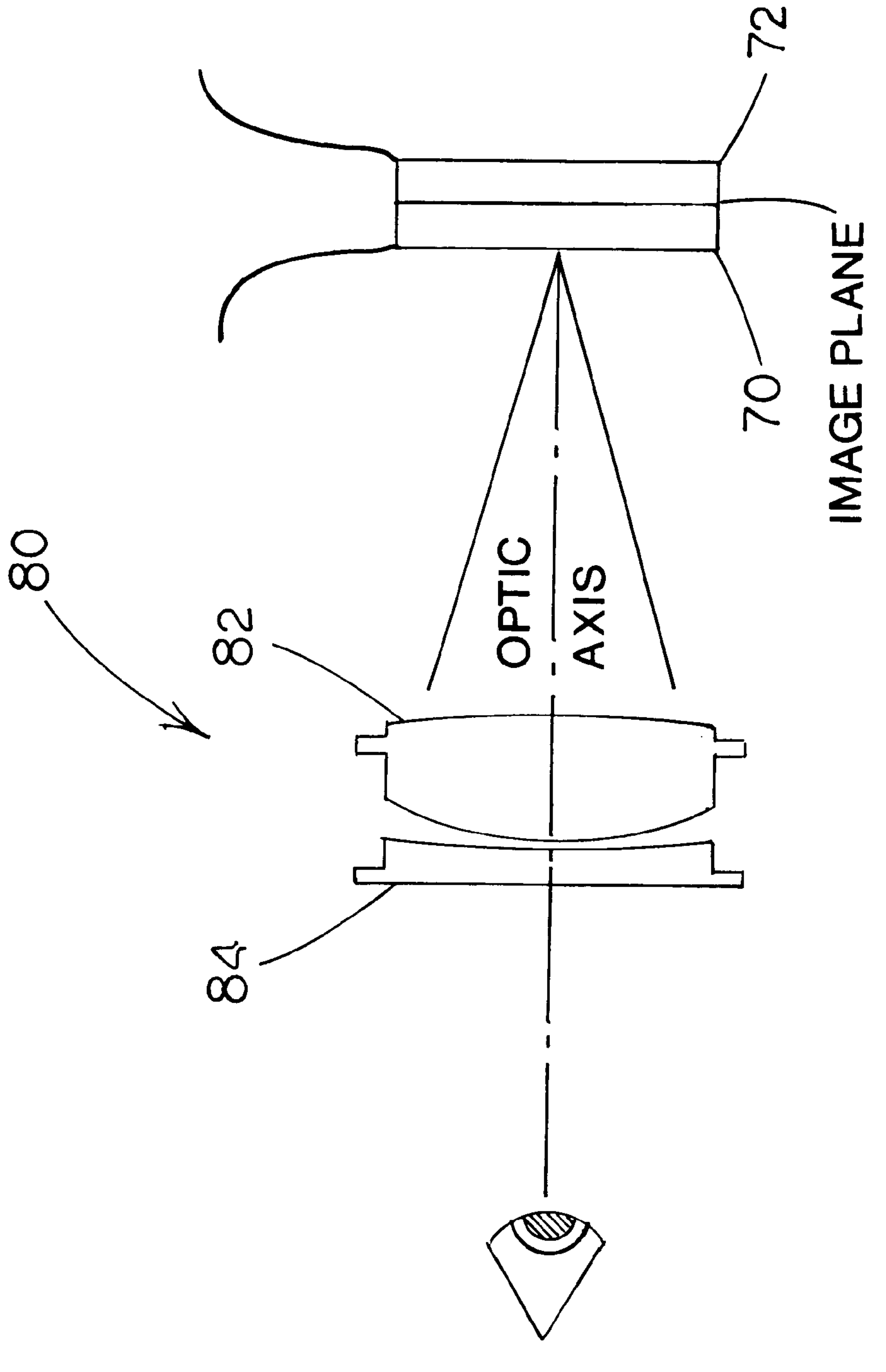
FIG. 5 is a simplified diagram of the optical system of the bar code viewer.
Figure 6:
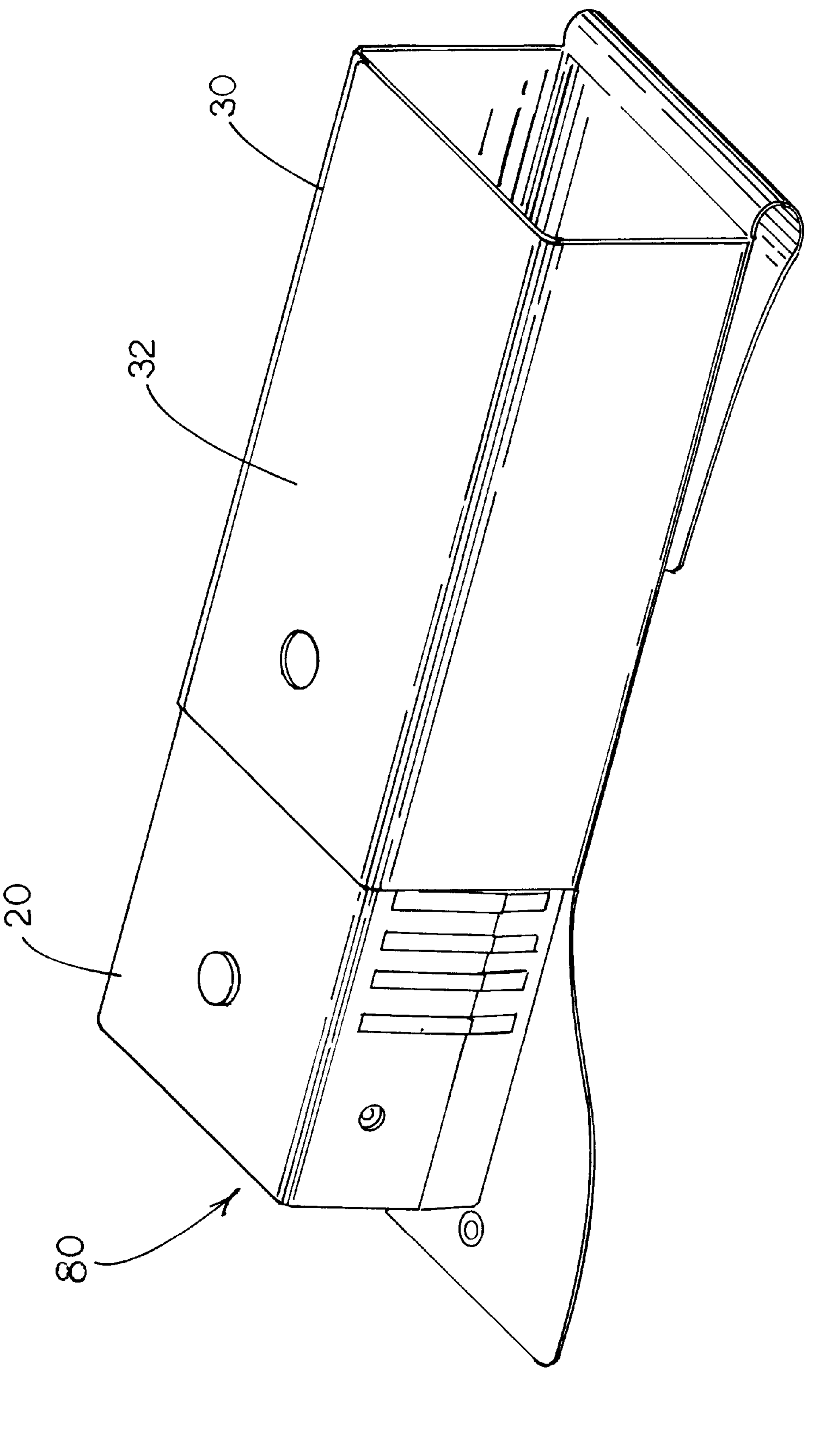
FIG. 6 perspective view of the bar code viewer with the sheath main body moved to the deployed position so as form a shroud for the viewer.

Preferably, the housing 20 is surrounded by a sheath 30, preferably made from a semi-rigid material such as leather, vinyl, or the like. See FIGS. 1–3. The sheath 30 includes a main body 32 and preferably two opposed flexible end flaps 34. The main body 32 generally conforms to the shape of the viewer housing 20. In the embodiment shown, the housing 20 has a generally rectangular cross section so the sheath main body 32 likewise has a generally rectangular cross section. The end flaps 34 hinge about an edge of the openings at each respective end of the main body 32 and may be wrapped across the respective ends and snapped closed so as to enclose the viewer housing 20 within the sheath 30. See FIG. 3. One advantage of such a sheath 30 is that the main body 32 may be used as a shroud to shield the camera 60 from ambient infrared light. For instance, with the end flaps 34 open, the viewer housing 20 may be slid partially out of the sheath 30 so that the end of the viewer housing 20 having the camera 60 is displaced towards the middle of the sheath 30. In this manner, the sheath main body 32 forms what can be loosely described as a telescoping shroud that extends out from the viewer 10. See FIG. 6. In conditions where the ambient infrared light is too bright, as may be indicated by the ambient infrared light sensor 54, the sheath 30 may be deployed as described and placed close to or against the object having the bar code so as to better allow viewing thereof.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A portable viewer for viewing markings that are at least partially invisible ink markings, the invisible ink emitting light at an emission frequency in response to light of an excitation frequency being impinged thereon, comprising:

a) a light source for generating light at the excitation frequency;

b) a camera sensitive to light at said emission frequency for detecting the image created by said emitted light in response to light from said light source impinging upon the invisible ink;

c) a display for displaying, in the visible spectrum, the image detected by said camera; and d) a magnifying optical system disposed between said display and the user for magnifying the image on said display.

2. The portable viewer of 1 further including a filter in the optical path leading to said camera, said filter selectively allowing light in a predetermined frequency band to pass through to said camera.

3. The portable viewer of claim 2 wherein the predetermined band pass frequency band of said filter is approximately 700 nm to approximately 1200 nm.

4. The portable viewer of claim 2 wherein said filter substantially blocks light at the excitation frequency.

5. The portable viewer of claim 1 wherein said light source is a plurality of light emitting diodes.

6. The portable viewer of claim 5 wherein said light emitting diodes emit light across a spectrum of wavelengths with a peak wavelength of approximately 660 nm.

7. The portable viewer of claim 1 wherein said markings are entirely invisible ink markings.

8. The portable viewer of claim 1 wherein said display has dimensions no larger than 2 5/16 inch by 1 9/16 inch by 4 5/8 inch.

9. The portable viewer of claim 1 wherein said magnifying optical system magnifies the image on the display for the user by at least five times.

10. The portable viewer of claim 1 further including a backlight for said display.

11. The portable viewer of claim 10 wherein said backlight and said display consume not more than approximately 20 mW combined.

12. The portable viewer of claim 1 further including a light switch for controlling said light source.

13. The portable viewer of claim 1 wherein said camera includes an input and further including an ambient light sensor disposed near said camera input.

14. The portable viewer of claim 1 further including a housing, said housing enclosing said light source, said camera, said display, and said magnifying optical system.

15. The portable viewer of claim 14 further including a cover disposed around said housing and moveable between a storage position and a deployed position, wherein said cover functions as a shroud for said camera in said deployed position.

16. The portable viewer of claim 15 wherein said shroud is moveable longitudinally with respect to said housing between said storage position and said deployed position.

17. A portable viewer for viewing invisible ink markings, the invisible ink emitting light at an emission frequency in response to light of an excitation frequency being impinged thereon, comprising:

a) a plurality of light emitting diodes for generating light at the excitation frequency;

b) a camera sensitive to light at said emission frequency for detecting the image created by said emitted light in response to light from said light source impinging upon the invisible ink;

c) a filter in the optical path leading to said camera, said filter selectively allowing light having a frequency in a predetermined frequency band to pass therethrough to said camera; said frequency band including said emission frequency; said filter substantially blocking light at the excitation frequency;

d) a transmissive LCD display for displaying, in the visible spectrum, the image detected by said camera;

e) a backlight for said display;

f) a magnifying optical system disposed between said display and the user of the viewer for magnifying the image on said display for the user by at least five times;

g) a housing enclosing said light source, said camera, said display, said backlight, and said magnifying optical system; and h) wherein said backlight and said display consume not more than approximately 20 mW combined.

18. The portable viewer of claim 17 wherein said display has dimensions no larger than 2 5/16 inch by 1 9/16 inch by 4 5/8 inch.

19. The portable viewer of claim 17 wherein said light emitting diodes emit light across a spectrum of wavelengths with a peak wavelength of approximately 660 nm and wherein the predetermined band pass frequency band of said filter is approximately 700 nm to approximately 1200 nm.

20. The portable viewer of claim 17 wherein said camera includes an input and further including an ambient light sensor disposed near said camera input; said ambient light sensor generating an alarm when the ambient light at said emission frequency sensed at said ambient light sensor is above a predetermined level.

21. The portable viewer of claim 17 further including a cover disposed generally around said housing and moveable between a deployed position and a storage position; said cover forming a shroud for said camera in said deployed position.

22. A portable viewer for viewing invisible ink markings, the invisible ink emitting light at an emission frequency in response to light of an excitation frequency being impinged thereon, comprising:

a) a housing;

b) a camera disposed in said housing for detecting the invisible markings and generating an image of the invisible markings;

c) a display operatively connected to said camera for displaying the image to a user;

d) a light shroud for shielding said camera from ambient light; said shroud moveable between a deployed position and a storage position.

23. The portable viewer of 22 wherein said light shroud comprises a sheath surrounding said housing.

24. The portable viewer of claim 23 wherein said sheath includes a main body and a pair of flexible end flaps attached to opposing ends of said main body that fold up to substantially enclose said housing.

* * * * *